United States Patent
Farr

(10) Patent No.: US 7,257,555 B1
(45) Date of Patent: Aug. 14, 2007

(54) METHOD AND SYSTEM FOR PROVIDING DIVIDEND ENHANCED CONVERTIBLE STOCKS WITH ACCELERATION TRIGGERS

(75) Inventor: Craig Farr, Rye, NY (US)

(73) Assignee: Citigroup Global Markets, Inc., New York, NY (US)

( * ) Notice: Subject to any disclaimer, the term of this patent is extended or adjusted under 35 U.S.C. 154(b) by 130 days.

(21) Appl. No.: 10/812,902

(22) Filed: Mar. 31, 2004

Related U.S. Application Data

(60) Provisional application No. 60/458,419, filed on Mar. 31, 2003.

(51) Int. Cl.
*G06Q 40/00* (2006.01)
(52) U.S. Cl. .................. 705/36 R; 705/35
(58) Field of Classification Search .......... 705/35–37
See application file for complete search history.

(56) References Cited

U.S. PATENT DOCUMENTS

| | | | |
|---|---|---|---|
| 6,912,510 B1* | 6/2005 | Shepherd | 705/37 |
| 2002/0133442 A1 | 9/2002 | Laycock | |
| 2003/0093375 A1 | 5/2003 | Green et al. | |
| 2003/0130941 A1 | 7/2003 | Birle, Jr. et al. | |
| 2003/0135446 A1* | 7/2003 | Birle et al. | 705/37 |
| 2003/0163400 A1* | 8/2003 | Ross et al. | 705/35 |
| 2003/0225656 A1 | 12/2003 | Aberman et al. | |
| 2004/0039669 A1 | 2/2004 | Jones et al. | |
| 2004/0098327 A1* | 5/2004 | Seaman | 705/36 |
| 2004/0133494 A1 | 7/2004 | Jones et al. | |
| 2005/0102213 A1* | 5/2005 | Savasoglu et al. | 705/36 |
| 2006/0282356 A1* | 12/2006 | Andres et al. | 705/35 |

FOREIGN PATENT DOCUMENTS

| | | | |
|---|---|---|---|
| JP | 2001319062 A | * | 11/2001 |
| JP | 2002109220 A | * | 4/2002 |
| JP | 2005050345 A | * | 2/2005 |

OTHER PUBLICATIONS

Farr Lucy et al "Contingent Convertibles" Practical US/International Tax Strategies, Feb. 13, 2002, pp. 1-2.*

Petersen, J.E., "Innovations in Tax Exempt Instruments and Transactions", National Tax Journal, vol. 44, No. 4, pp. 11-28, Dec. 1991.

Wofe, George G. et al., "Certain legal aspects of secondary market municipal derivative products", Business Lawyer, vol. 49, No. 4, pp. 1629-1689, Aug. 1994.

Freeman, Louis S. et al., "Tax consequences of business and investment-driven uses of derivatives", Taxes, vol. 72, No. 12, pp. 947-994, Dec. 1994.

(Continued)

*Primary Examiner*—Narayanswamy Subramanian
(74) *Attorney, Agent, or Firm*—George T. Marcou; Kilpatrick Stockton LLP

(57) ABSTRACT

The present invention relates to a method and system for providing and/or offering mandatory convertible securities, such as dividend enhanced common/convertible stocks (DECS), with acceleration triggers for securities conversion. The acceleration triggers are attractive to investors of such mandatory convertible securities because they can provide investors with timely returns and/or equities in the issuer should events not favorable to the investors happen prior to a preset securities conversion date.

16 Claims, 3 Drawing Sheets

OTHER PUBLICATIONS

"Raising debt at a cost below prevailing market rates", International Tax, pp. 21-40, Jun. 2000.

Wallace, P. Woodbridge et al., "Do You Have Derivatives Lurking in Your Hybrids?", Bank Accounting & Finance, vol. 13, No. 3, pp. 35+, Spring 2000.

Ricks, Jo Lynn et al., "FSA Forgoes Conventional Wisdom in Characterizing a Remarketing Payment Under a Callable/Puttable Bond", The Tax Advisor, vol. 33, No. 3, pp. 168-170, Mar. 2002.

\* cited by examiner

METHOD AND SYSTEM FOR PROVIDING DIVIDEND ENHANCED CONVERTIBLE STOCKS WITH ACCELERATION TRIGGERS

PRIORITY

This application claims priority to U.S. Provisional Patent Application No. 60/458,419, filed Mar. 31, 2003, entitled, "METHOD AND SYSTEM FOR PROVIDING DIVIDEND ENHANCED CONVERTIBLE STOCKS WITH ACCELERATION TRIGGERS," which is herein incorporated by reference in its entirety.

BACKGROUND OF THE INVENTION

1. Field of the Invention

The present invention relates to the field of structured financial products. More particularly, the present invention relates to a method and system for offering mandatory convertible securities, such as dividend enhanced common/convertible stocks (DECS), with acceleration triggers for securities conversion.

2. Background

As known in the art, structured financial products are financial instruments that are issued and sold by business entities (e.g., corporations) to investors for capital-raising activities. Typically, structured financial products are particularly designed and created by investment institutions for the business entities to meet the specific capital-raising needs of such entities. In turn, investors purchase structured financial products, focusing-on payoff patterns (i.e., appreciation and/or income) of the products, to address their specific investment objectives. As referred herein, an investor can be an individual, a group of individuals, an organization, or a business entity.

One of the many structured financial products in existence today is the dividend enhanced convertible stock (DECS). As understood in the art, a standard DECS (also referred to as PRIDES, PEPS, MEDS, SAILS, PIES, or other names) is basically a convertible security that is often issued by a business entity as a fixed income instrument, e.g., a bond or a preferred stock, with an attractive yield (i.e., an enhanced dividend) and a special feature, namely, an automatic conversion (typically with a conversion premium) into a common stock at a future time. The conversion typically works as follows: on the mandatory conversion date each fixed income instrument will convert into one share of common stock if the share price on such date is below or at the same value as the share price on the date the fixed income instrument was issued; however, on the mandatory conversion date each fixed income instrument will convert into less than one share of common stock if the share price on such date is above the value of the share price on the date the fixed income instrument was issued. An investor see DECS as an attractive investment because he or she earns a higher income return from the enhanced dividend of the DECS than he or she would have as a common stockholder. Hence, the investor gives up some upside participation in exchange for the downside protection (i.e., lower downside risk). On the other hand, the business entity sees DECS as an attractive means to raise capitals with high-equity credit, almost as high as issuing common stock from a rating agency's perspective, and to attract a different pool of investors.

A major drawback with the standard DECS structure is that based on the current U.S. tax codes, there is no tax deductibility on the enhanced dividends that the DECS issuer has to pay out to the DECS holders. Hence, another structured financial product named the Upper DECS was created in the financial markets to address this drawback. As known in the art, the Upper DECS structure differs from the standard DECS structure in that the Upper DECS combines several securities into a single investment unit. Particularly, the Upper DECS combines a fixed income instrument having a certain maturity date (e.g., a five-year fixed income instrument) and a coupon (i.e., enhanced dividend) with a forward purchase contract that obligates the investor to purchase a certain number of common-stock shares (e.g., a three-year purchase contract) through the remarketing of the fixed income instrument. Hence, when an investor purchases an Upper DECS, he or she in effect purchases a fixed income instrument and a forward purchase contract. However, the entire proceed that the investor pays for the Upper DECS first will be allocated to fixed income instrument, and none is allocated to the forward purchase contract. For instance, when a first investor pays $100 for an Upper DECS with a five-year fixed income instrument and a three-year purchase contract at year 0, the entire amount of $100 is first paid to the issuer for the fixed income instrument. At year 3 the purchase contract matures, and the first investor is required to satisfy the contract by purchasing the contracted number of common-stock shares with a conversion premium.

To ensure that the first investor has the requisite funds to purchase the common-stock shares, the Upper DECS requires that the fixed income instrument be remarketed (by a remarketing agent) at year 3 to a second investor in order to raise another $100 for the first investor to purchase the shares from the issuer. Because the fixed income instrument has a five-year maturity date, it will remain outstanding for another two years, wherein at year 5 the issuer pays the second investor $100 to satisfy the fixed income instrument. Of course, the first investor receives the enhanced dividend as an Upper DECS holder from year 0 to year 3, and the second investor receives the enhanced dividend as an Upper DECS holder from year 3 to year 5. As mentioned earlier, a benefit of the Upper DECS over the standard DECS includes the ability of the issuer to have a tax deduction paid out on the fixed income instrument coupon, i.e., the paid-out enhanced dividend.

SUMMARY OF THE INVENTION

Because the Upper DECS includes a forward contract for purchasing common-stock shares, it is essentially a bridge to an equity issuance. Hence, rating agencies such as Standard and Poor and Moody's may be hesitant to confer full equity credit to an Upper DECS that is issued by a lower-rated issuer because the issuer may not be in a position in the future to issue the common-stock shares as required by the forward purchase contract included in the Upper DECS.

Hence, there exists a need for a system and method for offering a structured financial product that provides the same benefits of an Upper DECS to the issuer and that is attractive to the investors.

Accordingly, an exemplary embodiment of the present invention provides a financial product comprising: a fixed income instrument having a predetermined remarketing date for remarketing the fixed income instrument; a coupon for the fixed income instrument; a forward purchase contract to purchase at least one equity share at a predetermined future contract date; and a first acceleration trigger clause to designate a first date to remarket the fixed income instrument prior to the predetermined remarketing date upon a happening of a first predetermined event.

Another embodiment of the present invention provides a method for offering a mandatory convertible security comprising: offering a fixed income instrument having a predetermined remarketing date for remarketing the fixed income instrument; offering a coupon for the fixed income instrument; offering a forward purchase contract to purchase at least one equity share at a predetermined future contract date; and providing a first acceleration trigger clause to designate a first date to remarket the fixed income instrument prior to the predetermined remarketing date upon a happening of a first predetermined event.

Additional aspects and novel features of the invention will be set forth in part in the description that follows, and in part will become more apparent to those skilled in the art upon examination of the present disclosure.

BRIEF DESCRIPTION OF THE DRAWINGS

The preferred embodiments of the present invention are illustrated by way of example and not limited to the following figures.

DETAILED DESCRIPTION OF THE INVENTION

Reference is now made in detail to embodiments of the present invention, some examples of which are illustrated in the accompanying drawings, in which like numerals indicate like elements, showing a method and system for providing and/or offering mandatory convertible securities with acceleration triggers for securities conversion.

Figure 1:
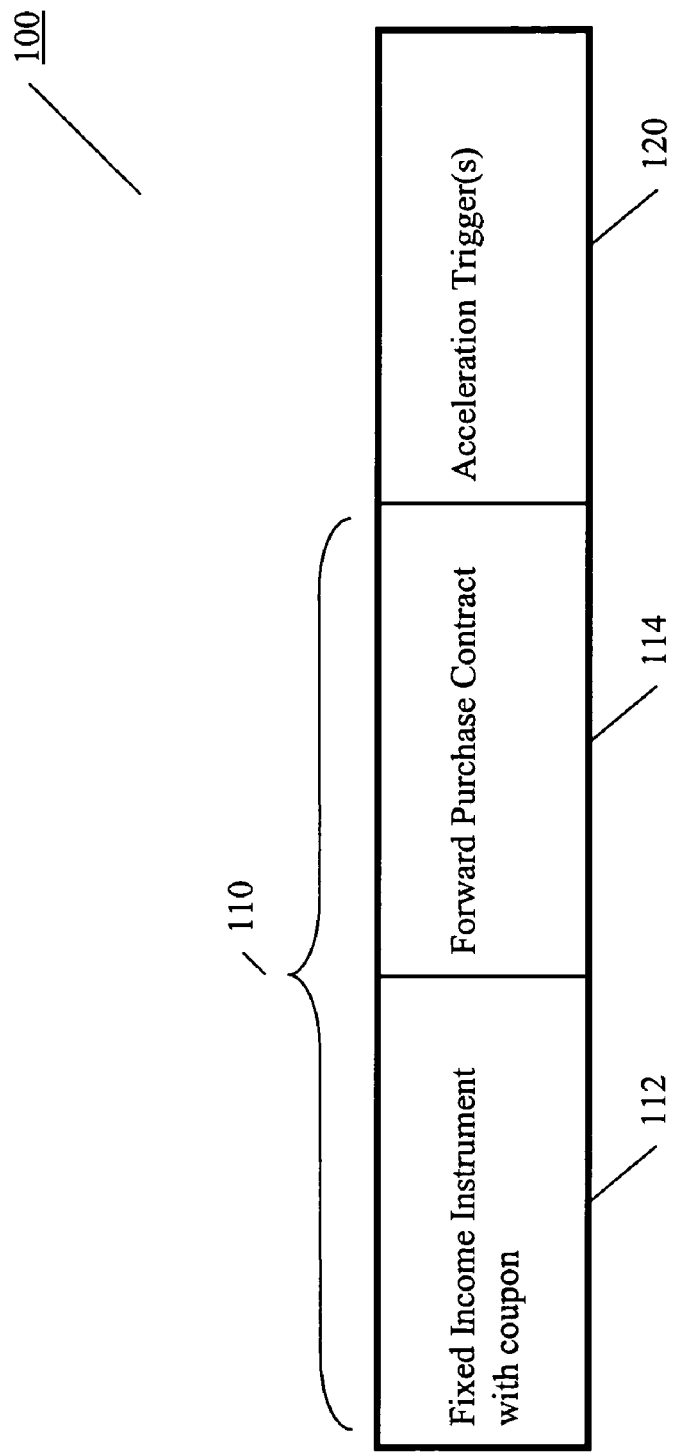
FIG. 1 depicts a mandatory convertible security in accordance with an embodiment of the present invention.

According to one embodiment of the present invention, as shown in FIG. 1, a mandatory convertible security 100 is provided in the form of an Upper DECS 110 structured with one or more added triggers 120 that can accelerate the remarketing of the senior-note (i.e., the underlying fixed income instrument) and/or the forward purchase contract. The Upper DECS 110 includes a fixed income instrument 112 having a certain maturity date and a coupon and a forward purchase contract 114 that obligates the buyer of the security 100, e.g., an investor, to purchase a certain number of common-stock shares through the remarketing of the fixed income instrument 112. The added triggers 120, as provided by the issuer of the Upper DECS 110, can be activated based upon certain events including, but not limited to, regulatory ratios, credit ratios, liquidity ratios. Various example are described next with reference to FIG. 1 to explain the triggering events and effects thereof.

Figure 2:
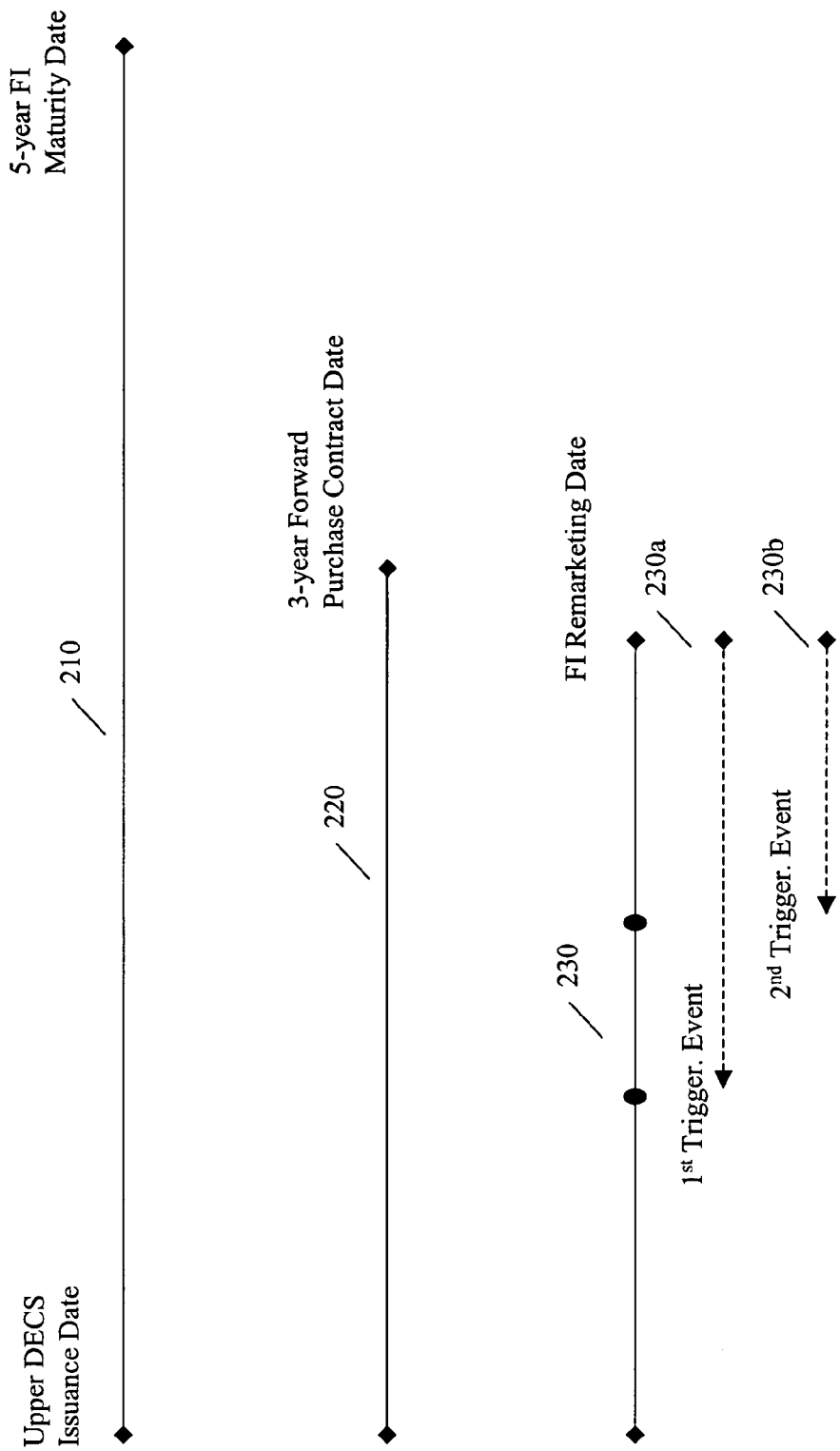
FIG. 2 depicts a timeline for various events associated with the mandatory convertible security shown in FIG. 1, in accordance with one embodiment of the present invention.

In a first example as shown by the timeline in FIG. 2, assuming the Upper DECS 110 has a fixed income instrument 112 having a five-year maturity date (shown as line 210), a coupon that pays out on a predetermined periodic basis at a predetermined interest rate as set by the issuer, a three-year forward purchase contract 114 (shown as line 220), and a remarketing date of the fixed income instrument 112 prior to the three-year forward purchase contract date (shown as line 230). The issuer can provide a first trigger 120 (e.g., in the form of a triggering clause in the Upper DECS 110) that specifies once the issuer's current credit rating drops one level (e.g., from well-capitalized to adequately-capitalized), the remarketing of the fixed income instrument 112 is accelerated to raise proceeds for the pre-funding of the remaining coupons of the Upper DECS 110 (shown as dashed line 230a). The accelerated remarketing is an option which the investor can elect to participate or not participate. If there is a further deterioration of the issuer's credit rating (e.g., the credit rating drops to "under-capitalized"), a second trigger can be provided to provide any investor that previously did not elect to participate in the remarketing upon the first trigger to now participate in the remarketing (shown as dashed line 230b). Although the first example shows that the first trigger happens before the second trigger, it should be understood that the two triggers can happen independently, e.g., the second trigger can happen before the first trigger.

Figure 3:
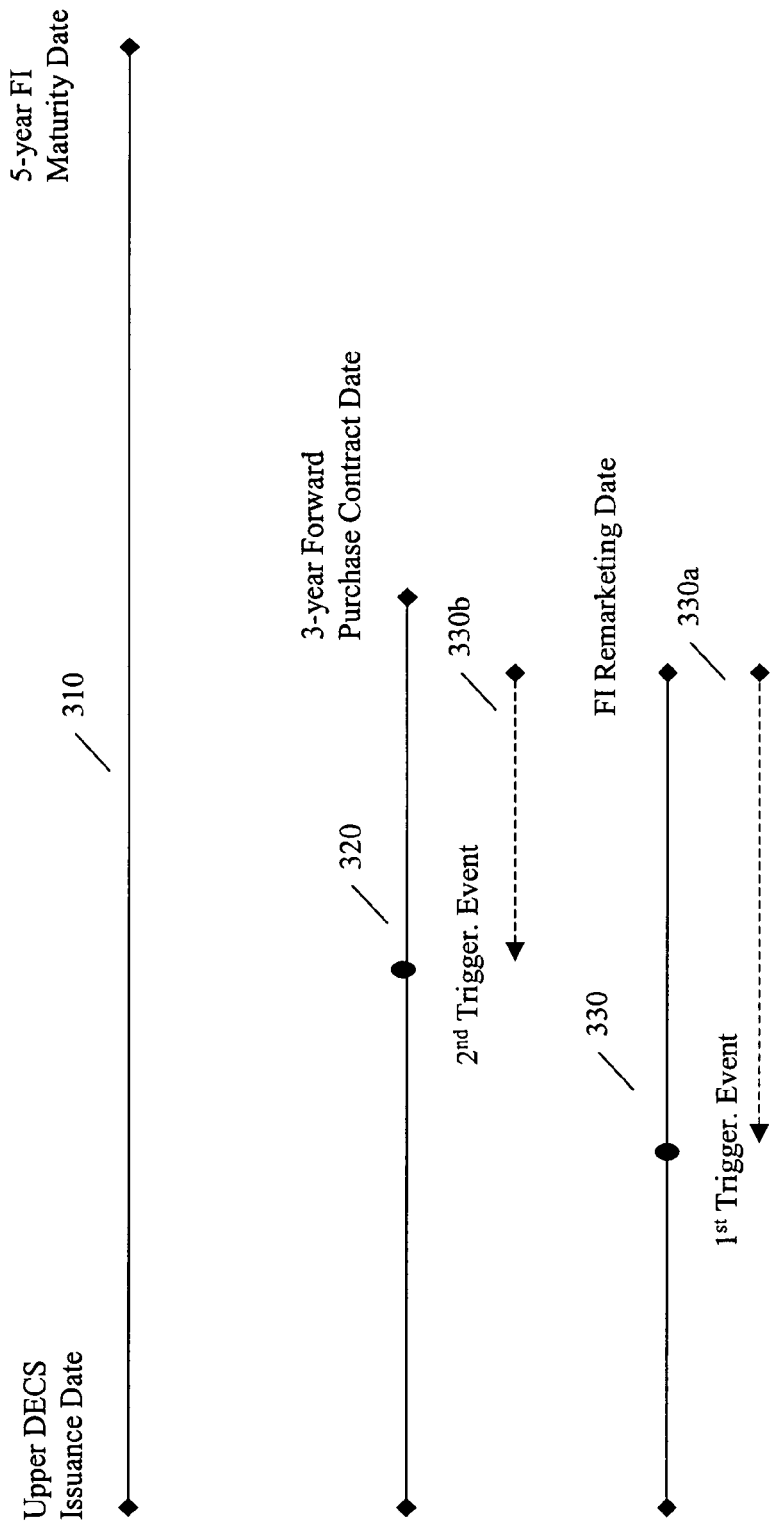
FIG. 3 depicts a timeline for various events associated with the mandatory convertible security shown in FIG. 1, in accordance with another embodiment of the present invention.

In a second example as shown by the timeline in FIG. 3, assuming again the Upper DECS 110 has a fixed income instrument 112 having a five-year maturity date (shown as line 310), a coupon that pays out on a predetermined periodic basis at a predetermined interest rate as set by the issuer, a three-year forward purchase contract 114 (shown as line 320), and a remarketing date of the fixed income instrument 112 prior to the three-year forward purchase contract date (shown as line 330). The issuer can provide a first trigger 120 (e.g., in the form of a triggering clause in the Upper DECS 110) that specifies once the issuer's current credit rating drops one level (e.g., from well-capitalized to adequately-capitalized), the remarketing of the fixed income instrument 112 is accelerated to raise proceeds for the pre-funding of the remaining coupons of the Upper DECS 110 (shown as dashed line 330a). Again, the accelerated remarketing is an option which the investor can elect to participate or not participate. If there is a further deterioration of the issuer's credit rating (e.g., the credit rating drops to "under-capitalized"), a second trigger can be provided to accelerate the forward purchase contract for either an immediate issuance of the equity (i.e., the requite common-stock shares stated in the contract) or an equity issuance date that is more immediate than the original equity issuance date (shown as dashed line 320a). If the investor initially did not participate in the remarketing of the fixed income instrument 112 upon the first trigger, the investor must now participate in the remarketing upon the second trigger and prior to the acceleration of the forward purchase contract. Hence, instead of being left with a fixed income instrument claim on the issuer when its credit rating has slipped to, for example, bankruptcy, (which will happen with the conventional Upper DECS) an investor who is the holder of an Upper DECS of the present invention will have equity in the issuer's business entity.

Although the above examples show that the acceleration triggers are activated based on changes in the issuer's credit rating, it should be understood that such acceleration triggers can be set as desired, including, but not limited to: 1) the triggering events can be any events other than the credit rating of the Bank's capital category; 2) the remarketing time frame for the fixed income instruments can be set as desired upon a triggering event; and 3) the acceleration of the stock purchase date of the forward purchase contract can be set as desired upon a triggering event. In other words, the triggering parameters, terms, and conditions can be set as desired by the issuer based on its capital-raising objectives and desire to attract different pools of investors.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A method for performing a financial transaction comprising the steps of:
   issuing a financial instrument to a first investor, the financial instrument comprising:
      a fixed income instrument having a predetermined remarketing date and a coupon;
      a forward purchase contract to purchase at least one equity share at a predetermined future contract date; and
      a first acceleration trigger clause to designate a first date to remarket the fixed income instrument prior to the predetermined remarketing date upon an occurrence of a first predetermined event;
   remarketing the fixed income instrument on the first date upon the occurrence of the first predetermined event including issuing the fixed income instrument to a second investor; and
   issuing at least one equity share to the first investor on the predetermined future contract date.

2. The method of claim 1, wherein the financial instrument further a second acceleration trigger clause to designate a second date to purchase the at least one equity share upon an occurrence of a second predetermined event, and issuing the at least one equity share upon the occurrence of the second predetermined event prior to the predetermined future contract date.

3. The financial instrument method of claim 2, wherein the second date is immediate upon the occurrence of the second predetermined event.

4. The method of claim 2, wherein the second date is a predetermined time after the occurrence of the second predetermined event.

5. The method of claim 2, wherein the second date is prior to the predetermined future contract date.

6. The method of claim 2, wherein the second predetermined event comprises a change in the credit rating of an issuer of the financial instrument.

7. The method of claim 1, wherein the financial instrument further comprises a second acceleration trigger to designate a third date to remarket the fixed income instrument upon a happening upon an occurrence of a second predetermined event, and remarketing the fixed income instrument upon the occurrence of the second predetermined event prior to the remarketing date.

8. The method of claim 7, wherein the third date is prior to the first date.

9. The method of claim 7, wherein the first date is prior to the third date.

10. The method of claim 7, wherein the third date is immediate upon the occurrence of the second predetermined event.

11. The financial instrument method of claim 7, wherein the third date is a predetermined time after the occurrence of the second predetermined event.

12. The method of claim 7, wherein the third date is prior to the predetermined remarketing date.

13. The method of claim 7, wherein the second predetermined event comprises a change in the credit rating of an issuer of the financial instrument.

14. The method of claim 1, wherein the first date is immediate upon the occurrence of the first predetermined event.

15. The method of claim 1, wherein the first date is a predetermined time after the occurrence of the first predetermined event.

16. The method of claim 1, wherein the first predetermined event comprises a change in the credit rating of an issuer of the financial instrument.

* * * * *

UNITED STATES PATENT AND TRADEMARK OFFICE
CERTIFICATE OF CORRECTION

PATENT NO. : 7,257,555 B1  Page 1 of 1
APPLICATION NO. : 10/812902
DATED : August 14, 2007
INVENTOR(S) : Craig Farr It is certified that error appears in the above-identified patent and that said Letters Patent is hereby corrected as shown below:

IN THE CLAIMS -

In Column 5, Line 29, please change "ment further a second acceleration trigger clause to design-" to -- ment further comprises a second acceleration trigger clause to desig- --

In Column 5, Line 35, please change "3. The financial instrument method of claim 2, wherein" to -- 3. The method of claim 2, wherein --

In Column 6, Line 9, please change "ment upon a happening upon an occurrence of a second" to -- ment upon an occurrence of a second --

In Column 6, Line 20, please change "11. The financial instrument method of claim 7, wherein" to -- 11. The method of claim 7, wherein --

Signed and Sealed this

Thirteenth Day of November, 2007

JON W. DUDAS
*Director of the United States Patent and Trademark Office*